US010118824B2

(12) United States Patent
Chiche et al.

(10) Patent No.: US 10,118,824 B2
(45) Date of Patent: Nov. 6, 2018

(54) PROCESS FOR PURIFYING SYNTHESIS GAS BY WASHING WITH AQUEOUS SOLUTIONS OF AMINES

(71) Applicants: SOFIPROTEOL, Paris (FR); AXENS, Rueil Malmaison (FR); IFP ENERGIES NOUVELLES, Rueil-Malmaison (FR); BIONEXT, Venette (FR); THYSSENKRUPP INDUSTRIAL SOLUTIONS AG, Essen (DE); TOTAL RAFFINAGE CHIMIE, Courbevoie (FR); COMMISSARIAT A L'ENERGIE ATOMIQUE ET AUX ENERGIES ALTERNATIVES, Paris (FR)

(72) Inventors: David Chiche, Lyons (FR); Anne Claire Pierron, Saint Maurice L'Exil (FR); Norbert Ullrich, Essen (DE)

(73) Assignees: AVRIL, Paris (FR); AXENS, Rueil Malmaison (FR); IFP ENERGIES NOUVELLES, Rueil Malmaison (FR); BIONEXT, Venette (FR); THYSSENKRUPP INDUSTRIAL SOLUTIONS AG, Essen (DE); TOTAL RAFFINAGE CHIMIE, Courbevoie (FR); COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 15/105,075

(22) PCT Filed: Dec. 16, 2014

(86) PCT No.: PCT/EP2014/077972
§ 371 (c)(1),
(2) Date: Jun. 16, 2016

(87) PCT Pub. No.: WO2015/091490
PCT Pub. Date: Jun. 25, 2015

(65) Prior Publication Data
US 2016/0368767 A1 Dec. 22, 2016

(30) Foreign Application Priority Data
Dec. 17, 2013 (FR) ..................... 13 62751

(51) Int. Cl.
C01B 3/52 (2006.01)
C01B 3/58 (2006.01)
(Continued)

(52) U.S. Cl.
CPC .............. *C01B 3/52* (2013.01); *C01B 3/16* (2013.01); *C01B 3/56* (2013.01); *C01B 3/58* (2013.01);
(Continued)

(58) Field of Classification Search
CPC ........................................ C01B 3/52
See application file for complete search history.

(56) References Cited

U.S. PATENT DOCUMENTS 5,441,990 A 8/1995 Robin et al.
8,257,452 B2 9/2012 Menzel
(Continued)

FOREIGN PATENT DOCUMENTS

DE 102004062687 A1 6/2006
FR 2420568 A1 10/1979
(Continued)

OTHER PUBLICATIONS

Carbon Dioxide Removal from Flue Gas Using Amine-Based Hybrid Solvent Absorption S. Rinprasertmeechai et al. International Journal of Chemical and Biological Engineering, vol. 6, pp. 296-300 (Year: 2012).*
(Continued)

Primary Examiner — Douglas B Call
(74) Attorney, Agent, or Firm — Millen White Zelano and Branigan, PC

(57) ABSTRACT

The invention relates to a process for purifying synthesis gas, comprising at least one stage for separating the crude synthesis gas to be treated into at least two effluents, namely a first part and a complementary part, in which the said first part is subjected to a carbon monoxide conversion stage with steam and the said complementary part is subjected to a COS
(Continued)

and HCN catalytic hydrolysis stage, the two gas flows, namely the first part and complementary part, are then each treated separately in two stages intended to remove acid gases such as $CO_2$ and $H_2S$, by washing with aqueous solutions of specific amines, before a recombination stage of the two treated effluents.

24 Claims, 4 Drawing Sheets

(51) Int. Cl.
 *C10G 2/00* (2006.01)
 *C01B 3/16* (2006.01)
 *C01B 3/56* (2006.01)
(52) U.S. Cl.
 CPC ...... *C10G 2/331* (2013.01); *C01B 2203/0283* (2013.01); *C01B 2203/045* (2013.01); *C01B 2203/047* (2013.01); *C01B 2203/0415* (2013.01); *C01B 2203/0435* (2013.01); *C01B 2203/0465* (2013.01); *C01B 2203/0475* (2013.01); *C01B 2203/0485* (2013.01); *C01B 2203/06* (2013.01); *C01B 2203/062* (2013.01); *C01B 2203/1041* (2013.01); *C01B 2203/1047* (2013.01); *C01B 2203/1052* (2013.01); *C01B 2203/1082* (2013.01); *C01B 2203/145* (2013.01); *C01B 2203/146* (2013.01); *C01B 2203/147* (2013.01)

(56) References Cited

U.S. PATENT DOCUMENTS

| | | |
|---|---|---|
| 8,439,991 B2 | 5/2013 | Abbott |
| 8,641,790 B2 | 2/2014 | Ansorge et al. |
| 8,642,667 B2 | 2/2014 | Abbott |
| 2008/0134686 A1 | 6/2008 | Menzel |
| 2010/0031572 A1* | 2/2010 | Ansorge .............. C01B 3/16 48/210 |
| 2010/0236407 A1* | 9/2010 | Demmers .......... B01D 53/1462 95/161 |
| 2011/0124749 A1 | 5/2011 | Abbott |
| 2011/0137089 A1 | 6/2011 | Abbott |
| 2012/0046370 A1* | 2/2012 | Sprachmann .......... B01D 53/75 518/705 |
| 2013/0327990 A1* | 12/2013 | Mak ................... B01D 53/1406 252/373 |
| 2014/0102943 A1 | 4/2014 | Ansorge et al. |

FOREIGN PATENT DOCUMENTS

| | | |
|---|---|---|
| WO | 2006/070018 A1 | 7/2006 |
| WO | 2009/019497 A2 | 2/2009 |
| WO | 2010/013026 A1 | 2/2010 |
| WO | WO2010/112517 | * 10/2010 |
| WO | WP2012/075000 | * 6/2012 |

OTHER PUBLICATIONS

Removal of carbon dioxide by absorption in mixed amines: modelling of absorption in aqueous MDEA/MEA and AMP/MEA solutions B. P. Mandel Chemical Engineering Science, vol. 56, pp. 6217-6224 (Year: 2001).*
Kinetics of CO induced degradation of aqueous diethanolamine Aqil Jamil et al Chemical Engineering Science, vol. 56, pp. 6743-6760 (Year: 2001).*
International Search Report dated Mar. 20, 2015 issued in corresponding PCT/EP2014/077972 application (3 pages).
English Abstract of FR 2420568 A1 published Oct. 19, 1979.
M.P. Sukumaran Nair, "CO2 Removal Systems for Ammonia Plants—A Survey", Nitrogen and Methanol, No. 264 (2003) pp. 19-20, 22-26, 28.
W. Boll et al., "Gas Production, 3. Gas Treating, 2. Carbon Monoxide Shift Conversion", Ullmann's Encyclopedia of Industrial Chemistry, vol. 16 (Oct. 15, 2011) pp. 484-539.

* cited by examiner

PROCESS FOR PURIFYING SYNTHESIS GAS BY WASHING WITH AQUEOUS SOLUTIONS OF AMINES

FIELD OF THE INVENTION

The present invention relates in general to the purification of synthesis gases containing carbon monoxide CO, and relates more particularly to processes enabling the acid gases such as for example $CO_2$, $H_2S$, COS, and HCN to be removed by carrying out a wash with one or more solvents.

Advantageously the process of the invention is employed upstream of a Fischer-Tropsch synthesis unit, in order to remove the impurities and in particular the acid gases that are harmful to the satisfactory operation of the said unit. The process can also be used to purify the synthesis gas used for example in cogeneration installations, and in chemical synthesis processes such as methanol synthesis processes.

PRIOR ART

Synthesis gases are generally gaseous mixtures containing carbon monoxide CO, hydrogen $H_2$, steam and carbon dioxide $CO_2$. They can be obtained by converting natural gas, coke or biomass by processes such as steam reforming, autothermal reforming or partial oxidation, or also by the decomposition of methanol, or from any other process known to the person skilled in the art.

Synthesis gases are intermediate chemical compounds that can be used in cogeneration installations, or in chemical synthesis processes such as methanol synthesis processes. The synthesis gases are also employed in processes for producing synthetic hydrocarbons by the Fischer-Tropsch reaction, in particular LPG (Liquefied Petroleum Gas) fractions, naphtha, gasoline, kerosene and high-quality gas oil or lubricating bases.

However, the crude synthesis gases obtained according to these production processes also contain a certain number of impurities, including sulphur compounds such as hydrogen sulphide $H_2S$ and carbonyl sulphide COS, nitrogen compounds such as ammonia $NH_3$ and hydrogen cyanide HCN, halogenated compounds and metals, which are generally removed so that the gas contains only residual amounts of such impurities, in order not to affect the satisfactory operation of the downstream units. In addition, although carbon dioxide $CO_2$ in the synthesis gas is regarded as inert for most of its applications, it is however present in a large amount in the synthesis gas, and should also be removed in order to achieve levels of the order of a few percent.

The impurities present in the unpurified synthesis gas may lead to an accelerated corrosion of the installations in which they are used, such as for example gas turbines in cogeneration units (or "IGCC" for "Integrated Gasification Combined Cycle"), and are capable of poisoning the catalysts used for the chemical synthesis processes such as those employed in the Fischer-Tropsch synthesis or the synthesis of methanol, or also of adversely affecting the performances of the materials used in fuel cells. Environmental considerations also require the removal of the impurities present in the gases.

In the particular case of the Fischer-Tropsch synthesis, specifications for the synthesis gas thus cover:
the relative amounts of $H_2$ and CO, for which a $H_2/CO$ ratio is optimised for the synthesis of hydrocarbons, and is generally between 1.5 and 2.5,
the $CO_2$ content should be at most 5% for the optimal operation of the Fischer-Tropsch unit,
the levels of impurities, including sulphur, nitrogen, halogenated and metal compounds, capable of poisoning the catalyst: the requisite specifications on entering the Fischer-Tropsch unit are particularly stringent, and the levels present in the synthesis gas should generally be less than 10 ppb by weight for sulphur impurities, less than 10 ppb by weight for HCN, less than 10 ppb for $NH_3$, and less than 10 ppb by weight for halogenated impurities [M. J. A. Tijmensen, A. P. C. Faaij, C. N. Hamelinck, M. R. M. van Hardeveld, "Exploration of the possibilities for production of Fischer Tropsch liquids and power via biomass gasification", *Biomass and Bioenergy*, 2002, 23(2), 129-152].

The crude synthesis gas obtained directly from the gasification or obtained according to any other method known to the person skilled in the art should therefore undergo gas treatment stages aimed at achieving the specifications required for the application in which the synthesis gas is used.

The production stage of the employed synthesis gas may lead to a production of hydrogen and carbon monoxide, the relative amounts of which depend on the feedstocks used for the production of the synthesis gas and on the gas production process and the conversion operating conditions [C. Higman, M. van der Burgt, "Gasification", Gulf Publishing, 2008; C. Ratnasamy, J. P. Wagner, "Water gas shift catalysis", *Catalysis Reviews*, 2009, 51, 325-440]. The produced synthesis gas may then have a $H_2/CO$ molar ratio that is not optimal for the Fischer-Tropsch reaction, particularly if the catalyst that is used is a cobalt-based catalyst that advantageously requires a $H_2/CO$ molar ratio of about 2 so as to be suitable for the production of middle distillates ["Fischer-Tropsch Technology", *Studies in Surface Science and Catalysis*, 2004, 152, 1-700].

In order to achieve the $H_2/CO$ molar ratio required by the Fischer-Tropsch synthesis, the crude synthesis gas is generally separated into two flows, one of which is routed to a unit for converting carbon monoxide with steam ("WGS" or "Water Gas Shift"), enabling a gaseous flow rich in hydrogen and a gaseous flow depleted in carbon monoxide to be obtained. This reaction produces large amounts of $CO_2$ however. The respective proportions between the gas flow undergoing the carbon monoxide conversion reaction with steam and the said complementary part are generally specified so as to obtain after recombination an effluent having the $H_2/CO$ molar ratio required for the satisfactory operation of the Fischer-Tropsch process, that is to say around 2. The gas obtained after recombination thus contains a larger amount of $CO_2$ compared to the crude synthesis gas.

The removal of the acid gases contained in the recombined gas flow, and in particular $CO_2$ and $H_2S$, is generally carried out by washing the gas with a solvent. In particular, the acid gas removal unit may employ aqueous solutions of alkanolamines such as monoethanolamine (MEA), diethanolamine (DEA), diisopropanolamine (DIPA), methyldiethanolamine (MDEA) or triethanolamine (TEA), which are conventionally used to sweeten natural gas. In this case the compounds to be removed ($H_2S$, $CO_2$) react chemically with the solvent [A. Kohl, R. Nielsen, "Gas Purification", Gulf Publishing, 1997].

The amounts of acid gases in the synthesis gas downstream of the wash stage with solvent are generally at most a few ppmv of $H_2S$ (generally less than 10 ppmv), and at most a few percent of $CO_2$ (generally less than 5 vol %). On account of the high levels of $CO_2$ contained in the crude synthesis gases, amines having rapid $CO_2$ absorption kinetics are generally favoured, namely primary or secondary amines such as monoethanolamine (MEA), diethanolamine (DEA), or tertiary amines activated by means of a secondary amine. For example the document U.S. Pat. No. 6,852,144 describes a method for removing acid compounds present in gaseous hydrocarbons. The method uses an aqueous solution of amines comprising a mixture of water and N-methyldiethanolamine or water and triethanolamine and containing a large proportion of a compound belonging to the following group: piperazine and/or methylpiperazine and/or morpholine.

One of the main disadvantages of this type of arrangement is the degradation by CO of the secondary amine used as an activator of the kinetic absorption of $CO_2$. In fact, CO may lead to the formation of salts of amine formates that are stable at high temperature, and formamides by reaction with the primary and secondary amines, those compounds being degradation products of the amines. These compounds are capable of accumulating in the solvent, causing a reduction in the efficiency of the solvent, and in some cases of causing an accelerated corrosion of the installations on account of the chelating properties of certain degradation products. The formation of these degradation products affects the performances of the washing processes with aqueous solutions of amines, as well as their operability (increased level of replacement of the solvent, in certain cases reprocessing and/or reactivation of the solvent, increase in the frequency of shutdown of the units, . . . ) and has a negative effect on the cost of the process (investment and operating costs) [A. L. Cummings, S. M. Mecum, "Increasing profitability and improving environmental performance by maintaining amine solvent purity", $50^{th}$ *Annual Laurance Reid Gas Conditioning Conference*, Norman (Oklahoma, USA), February 2000].

Tertiary amines are not or are only slightly sensitive to the presence of CO, which does not in this case lead to degradation of the solvent [A. Jamal, A. Meisen, "Kinetics of CO-induced degradation of aqueous diethanolamine", *Chemical Engineering Science,* 2001, 56, 6743-6760].

Furthermore, with the use of these solvents the minimum level of $H_2S$ that it is possible to obtain after treatment of the gas is a few ppm by volume, and the removal of the COS is only partial, of the order of 80% for a thorough removal. HCN is also removed, but is offset however by an irreversible degradation of the solvent [A. Kohl, R. Nielsen, "Gas Purification", Gulf Publishing, 1997].

An object of the present invention is to provide an improved process for the treatment and purification of synthesis gases enabling a synthesis gas to be obtained that is compatible with its use in the processes for synthesising hydrocarbon compounds such as the Fischer-Tropsch process.

In the present invention the applicant has employed a new process that enables the synthesis gas flows to be treated separately in specific sequences of stages and depending on their composition and in particular from the point of view of the levels of $CO_2$ and CO.

More particularly, the process of the invention integrates into the process chain a separation stage of the crude synthesis gas to be treated into at least two effluents, namely a first part and a complementary part, in which the said first part is subjected to a stage for converting carbon monoxide with steam; and the complementary part is subjected to a stage for the catalytic hydrolysis of COS and HCN; the two gas flows (first part and complementary part) are then each treated separately in two stages aimed at removing acid gases such as $CO_2$ and $H_2S$, by a wash with aqueous solutions of amines, before a recombination stage of the two treated effluents.

The process according to the invention enables the degradation of the solvents composed of aqueous solutions of amines to be reduced significantly, the level of replacement of the solvents to be reduced, the performances and operability of the process to be improved, while reducing the flow of solvents required for the removal of the acid gases. Apart from the advantages obtained in terms of levels of removal of acid gases, the process according to the invention is economically more advantageous while also allowing significant gains to be obtained in terms of investment and operating costs.

SUMMARY DESCRIPTION OF THE INVENTION

In particular, the invention relates to a process for purifying synthesis gas, comprising at least the following stages:
a) a stage for dividing the synthesis gas into at least a first synthesis gas flow and a second synthesis gas flow of the same composition,
b1) a stage for the steam conversion of the carbon monoxide of the first synthesis gas flow leaving the stage a), in order to produce a gaseous effluent containing at least hydrogen $H_2$ and carbon dioxide $CO_2$ and less than 15 vol % of carbon monoxide CO, preferably less than 10 vol % of CO, more preferably less than 5 vol % of CO, and still more preferably less than 3 vol % of CO,
b2) a stage for removal of the acid gases from the gaseous effluent leaving the stage b1) by contacting the said effluent with an aqueous solution of amines comprising at least one primary and/or secondary amine, mixed or not with at least one tertiary amine or a secondary amine containing at least one quaternary carbon atom in the α (alpha) position of the nitrogen atom or two tertiary carbon atoms in the α and α' position, so as to produce at least one gaseous effluent containing less than 5 vol % of carbon dioxide $CO_2$, preferably less than 1 vol % of $CO_2$, and less than 50 ppmv of $H_2S$, preferably less than 10 ppmv of $H_2S$, more preferably less than 5 ppmv of $H_2S$, and most preferably less than 1 ppmv of $H_2S$,
c1) a stage for the catalytic hydrolysis of the COS and HCN present in the second synthesis gas flow that has not undergone the conversion reaction of carbon monoxide with steam, in order to produce a gaseous effluent containing less than 25 ppm by volume of COS, preferably less than 10 ppm by volume of COS, and more preferably less than 5 ppm by volume of COS, and less than 5 ppm by volume of HCN, preferably less than 1 ppm by volume of HCN, and more preferably less than 0.5 ppm by volume of HCN,
c2) a stage for removal of the acid gases from the synthesis gas flow leaving the COS and HCN catalytic hydrolysis stage c1), by contacting the said flow with an aqueous solution of amines containing at least one tertiary amine, so as to produce at least one gaseous effluent containing less than 10 vol % of carbon dioxide $CO_2$, preferably less than 5 vol % of $CO_2$, and less than 50 ppmv of $H_2S$, preferably less than 10 ppmv of $H_2S$, preferably less than 5 ppmv of $H_2S$, and preferably less than 1 ppmv of $H_2S$, d) the recombination of at least a part of the gaseous effluents leaving the stages b2) and c2) in order to obtain a purified synthesis gas.

The purified synthesis gas thus obtained contains less than 5 vol % of carbon dioxide $CO_2$, preferably less than 2 vol % of $CO_2$, and less than 50 ppmv of $H_2S$, preferably less than 10 ppmv of $H_2S$, preferably less than 5 ppmv of $H_2S$, most preferably less than 1 ppmv of $H_2S$, and also residual amounts of COS and HCN, preferably less than 20 ppmv of COS, preferably less than 10 ppmv of COS, more preferably less than 5 ppmv of COS, and most preferably less than 2 ppmv of COS, and less than 10 ppmv of HCN, preferably less than 5 ppmv of HCN, preferably less than 1 ppmv of HCN.

In addition the synthesis gas obtained from the recombination stage d) contains $H_2$ and CO, and advantageously has a $H_2/CO$ molar ratio of preferably between 0.5 and 4, preferably between 1 and 3, and still more preferably between 1.5 and 2.5.

An advantage of the present invention is the fact that the synthesis gas flows are treated separately in specific sequences of stages and depending on their difference in composition, in particular on their difference in amounts of CO and $CO_2$.

An advantage of the present invention is that it enables the degradation of the aqueous solutions of amines used in the stages for removing acid gases to be reduced significantly, in particular by minimising the contact between CO and primary and secondary amines, and by greatly reducing the level of formation of degradation products, such as for example formamides and amines heat stable salts.

An advantage of the present invention is that it provides a process with improved performances and operability, while enabling inter alia the level of replacement of the solvents to be reduced.

An advantage of the present invention is that it provides a less costly process thanks to the separate treatment of the flows of synthesis gas, allowing a more efficient and reliable removal of $H_2S$, COS and HCN, and thus an overall reduction in the necessary flow rates of amines, a reduction in the size of the treatment units, and thus a gain in terms of investment and operating costs.

Furthermore, the process according to the present invention enables a large amount of impurities such as $H_2S$, COS, $CO_2$, HCN, $NH_3$ and metals possibly present in the synthesis gases, to be removed.

DETAILED DESCRIPTION OF THE INVENTION

The synthesis gas treated in the process of the invention may advantageously be obtained by the conversion of natural gas, coke or biomass, by processes such as steam reforming, autothermal reforming or partial oxidation, or also by the decomposition of methanol, or from any other process known to the person skilled in the art.

The composition of the crude synthesis gas depends on the feedstock and on the process used for the preparation of the gas. The crude synthesis gas generally contain carbon monoxide CO, hydrogen $H_2$, carbon dioxide $CO_2$, and steam. In particular, the synthesis gas contains between 5 and 65 vol % of CO, preferably between 10 and 50 vol % of CO, preferably between 12 and 45 vol % of CO, and between 1 and 65 vol of $H_2$, preferably between 3 and 50 vol % of $H_2$, preferably between 5 and 35 vol % of $H_2$, and between 1 and 50 vol % of $CO_2$, preferably between 5 and 45 vol % of $CO_2$, and preferably between 10 and 40 vol % of $CO_2$.

In general a synthesis gas contains numerous impurities such as sulphur compounds (such as $H_2S$, COS, mercaptans), nitrogen compounds (such as $NH_3$, HCN), halogenated compounds (HF, HCl, HBr, HI), and also metals, such as for example mercury, selenium, and metal carbonyls.

The amounts of impurities in the crude synthesis gas depend on the feedstock and on the process used to prepare the gas. More particularly, the amounts of sulphur compounds may be between 20 and 15000 ppm by weight, more specifically 50 to 10000 ppm by weight. The amounts of nitrogen compounds may be between 20 and 15000 ppm by weight, more specifically 50 to 10000 ppm by weight.

a) Separation Stage a) of the Crude Synthesis Pas

In accordance with the invention the synthesis gas is subjected to a separation or division stage a) into at least two effluents of the same composition, namely a first part and a complementary part, subjected to the following stages:
- a carbon monoxide conversion stage with steam b1) carried out on the said first part of the effluent leaving the stage a);
- a stage c1) for the catalytic hydrolysis of the compounds COS and HCN contained in the said complementary part of the effluent leaving the stage a) into $H_2S$ and $NH_3$.

According to the process of the invention, the respective proportions of the said flows leaving the division stage a) are advantageously specified so as to obtain a recombined effluent which, after possible purification stages aimed at removing the residual impurities, feeds the Fischer-Tropsch synthesis stage, and has a $H_2/CO$ molar ratio preferably between 0.5 and 4, more preferably between 1 and 3, and most preferably between 1.5 and 2.5.

Preferably the said first part constitutes at least 20 to 80 vol %, preferably 30 to 70 vol % and more preferably 40 to 60 vol % of the synthesis gas flow entering the said stage a).

b1) Conversion Stage b1) of Carbon Monoxide with Steam

The said stage b1) enables a gaseous effluent rich in $H_2$ and depleted in carbon monoxide CO to be produced. This reaction however produces large amounts of $CO_2$.

The production stage of the synthesis gas generally leads to a production of hydrogen and carbon monoxide in a $H_2/CO$ molar ratio that is not optimal for the Fischer-Tropsch reaction, particularly if the catalyst that is used is a cobalt-based catalyst that advantageously requires an optimal $H_2/C0$ molar ratio of about 2 in order to favour the production of middle distillates.

In order to achieve the WOO molar ratio required by the Fischer-Tropsch synthesis, the first part of the effluent leaving the separation stage a) is according to the invention routed to a section for converting carbon monoxide with steam b1), thereby enabling a gaseous flow to be produced that is enriched with hydrogen and carbon dioxide and depleted in carbon monoxide, according to the following reaction:

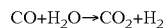

$$CO + H_2O \rightarrow CO_2 + H_2$$

Preferably the stage b1) is carried out at an entry temperature between 150 and 280° C., preferably between 200 and 280° C.

Advantageously, the reaction stage b1) for converting carbon monoxide with steam is carried out at an absolute pressure between 20 and 120 bar, preferably between 25 and 60 bar, and more preferably between 30 and 50 bar; at a gas hourly space velocity GHSV (feedstock volume/catalyst volume/hour) between 1000 and 10000 h$^{-1}$, preferably between 1000 and 9000 h$^{-1}$ and more preferably between 1500 and 8500 h$^{-1}$; at a temperature between 150 and 550° C., preferably between 200 and 550° C., and more preferably between 250 and 500° C.

The catalyst used in this stage b1) is a catalyst containing at least one element of group VIII and/or at least one element of group VIB of the Mendeleev Periodic Table (group VIII corresponds to groups 8, 9 and 10, and group VIB to group 6 according to the new notation of the periodic table of the elements: *Handbook of Chemistry and Physics*, 81$^{st}$ Edition, 2000-2001). Preferably the catalyst containing cobalt sulphide and/or molybdenum sulphide. The catalyst support is normally a porous solid chosen from the group consisting of aluminas, silica, silica-aluminas. Preferably the catalyst support is alumina. The catalyst used may be promoted with an alkali metal or alkaline earth metal promoter. The carbon monoxide conversion reaction enables the hydrogen content in the exiting effluent to be considerably increased.

If necessary water in liquid form, preferably in the form of steam and more preferably in the form of superheated steam, may be added upstream of the carbon monoxide conversion stage with steam, in order to adjust the $H_2O/CO$ ratio at the inlet of the stage b1). Advantageously the stage b1) is carried out with a $H_2O/CO$ ratio between 0.5 and 100, preferably between 0.5 and 25, more preferably between 1.5 and 10. On account of the exothermic nature of the carbon monoxide conversion reaction with steam, the gaseous effluent leaving this stage has a temperature between 250 and 550° C.

Advantageously, the catalyst used in the conversion stage of carbon monoxide with steam b1) also enables the hydrolysis reactions of carbonyl sulphide (COS) and of hydrogen cyanide (HCN) into $H_2S$ and $NH_3$ to be promoted. This stage allows the partial removal of COS and HCN, which are poisons for the Fischer-Tropsch synthesis catalyst. Furthermore, the hydrolysis of COS and HCN during the conversion stage of carbon monoxide with steam b1) allows a more thorough removal of COS and HCN when combined with the acid gases removal stage b2) located downstream. Furthermore, by carrying out the hydrolysis of HCN during this stage the solvent used in the stage b2) located downstream is also protected against a degradation of the reactive amines, which could possibly be caused by the presence of HCN.

In accordance with the invention, the first synthesis gas flow leaving the stage a) and having undergone the stage b1) for converting carbon monoxide with steam contains less than 15 vol % of carbon monoxide CO, preferably less than 10 vol % of CO, more preferably less than 5 vol % of CO, and still more preferably less than 3 vol % of CO, and contains between 5 and 80 vol % of $H_2$, preferably between 5 and 50 vol % of $H_2$, preferably between 10 and 40 vol % of $H_2$, and contains between 5 and 60 vol % of carbon dioxide $CO_2$, preferably between 10 and 50 vol % of $CO_2$, and preferably between 15 and 45 vol % of $CO_2$.

Advantageously, the effluent leaving the stage b1) for converting carbon monoxide with steam contains less than 100 ppm by volume of COS, preferably less than 80 ppm by volume of COS, and more preferably less than 60 ppm by volume of COS, and less than 10 ppm by volume of HCN, preferably less than 5 ppm by volume of HCN, and more preferably less than 2 ppm by volume of HCN.

In a variant of the process according to the invention, the gaseous effluent leaving stage b1) for converting carbon monoxide with steam is routed to a catalytic hydrolysis stage for converting COS and HCN into $H_2S$ and $NH_3$ (stage b1'), preferably after cooling to a temperature between 100 and 400° C., more preferably between 200 and 350° C. The stage b1') is then carried out according to the same operating conditions as those of the catalytic hydrolysis stage c1) described hereinafter.

Advantageously, the effluent leaving the hydrolysis unit of the stage b1') contains less than 50 ppm by volume of COS, preferably less than 25 ppm by volume of COS, and more preferably less than 10 ppm by volume of COS, and less than 5 ppm by volume of HCN, preferably less than 1 ppm by volume of HCN, and more preferably less than 0.5 ppm by volume of HCN.

According to another variant, the catalytic hydrolysis stage b1') of the compounds COS and HCN present in the first synthesis gas flow leaving the stage b1) may advantageously be employed in the stage b2) for removing the acid gases of the said first synthesis gas flow. This embodiment is described in the patent FR 2950265.

Washing the Effluent Leaving the Stage b1) with Water

In a preferred embodiment the effluent leaving the stage b1) is washed with water. This wash stage with water has the advantage of removing impurities such as $NH_3$ and HCl that are soluble in water and are particularly harmful to the operation of the stage b2) for the removal of the acid gases.

b2) Stage b2) for Removing the Acid Gases from the Gaseous Effluent Leaving the Stage b1)

In accordance with the invention, a stage for removing the acid gases from the gaseous effluent leaving the stage b1) of converting carbon monoxide with steam and having possibly undergone the stage b1') of the catalytic hydrolysis of COS and HCN is implemented by contacting the said effluent with an aqueous solution of amines containing at least one primary amine and/or secondary amine, mixed or not with at least one tertiary amine or one sterically hindered secondary amine, so as to produce at least one gaseous effluent containing less than 5 vol % of carbon dioxide $CO_2$, preferably less than 1 vol % of $CO_2$, and less than 50 ppmv of $H_2S$, preferably less than 10 ppmv of $H_2S$, preferably less than 5 ppmv of $H_2S$, and preferably less than 1 ppmv of $H_2S$.

Acid gases are understood to mean in particular the sulphur compounds $H_2S$ and COS, and the $CO_2$ remaining in the gaseous effluent leaving the stage b1).

The composition of the gaseous effluent leaving the stage b1), enriched in $H_2$ and $CO_2$ and depleted in carbon monoxide CO, enables an adapted aqueous solution of amines to be used in the said stage b2). In particular, an aqueous solution of amines sensitive to the presence of CO and ensuring a thorough removal of $CO_2$ and COS thanks to the rapid reaction kinetics may be used. Such solvents consist of aqueous solutions of primary and/or secondary amines, possibly mixed with a tertiary amine or a sterically hindered secondary amine.

In the present description the term "tertiary amine" is understood to mean any compound containing one or more amine groups and in which all the amine groups are tertiary groups.

In the present description the term "sterically hindered secondary amine" is understood to mean any compound containing one or more amine groups and in which the amine groups are tertiary or sterically hindered secondary groups, at least one group being a sterically hindered secondary group. The term "steric hindrance" of the secondary amine group is understood to mean either the presence of at least one quaternary carbon atom in the α (alpha) position of the nitrogen atom, or the presence of two tertiary carbon atoms in the α and α' positions.

In the case where the said stage b2) is carried out in the presence of an aqueous solution of amines containing at least one primary and/or secondary amine, mixed with at least one tertiary amine or a sterically hindered secondary amine, the primary and/or secondary amine or amines are called "activators". This type of arrangement enables the absorption capacities of the acid gases as well as the absorption kinetics of $CO_2$ and COS to be optimised. Since the absorption kinetics of $CO_2$ and COS are maximised by the use of a primary amine or a secondary amine, the removal of the acid gases from the gaseous effluent will be particularly promoted.

Preferably the primary amine or amines are chosen from monoethanolamine, aminoethylethanolamine, diglycolamine, 2-amino-2-methyl-1-propanol and its non N-substituted derivatives, individually or as a mixture.

Preferably the secondary amine or amines are chosen from diethanolamine (DEA), diisopropanolamine, piperazine and its derivatives containing at least a non substituted nitrogen atom, morpholine and its non N-substituted derivatives, piperidine and its non N-substituted derivatives, N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, individually or as a mixture.

Preferably the tertiary amine or amines are chosen from methyldiethanolamine (MDEA), triethanolamine, ethyldiethanolamine, diethylethanolamine, dimethylethanolamine, 1-methyl-4-(3-dimethylaminopropyl)-piperazine, 1-ethyl-4-(diethylaminoethyl)-piperazine, 1-methyl-4-hydroxy-piperidine, 1-methyl-2-hydroxymethyl-piperidine, tert-butyldiethanolamine, 1,2-bis-(2-dimethylaminoethoxy)-ethane, Bis(dimethylamino-3-propyl)ether, Bis(diethylamino-3-propyl) ether, (dimethylamino-2-ethyl)-(dimethylamino-3-propyl)-ether, (diethylamino-2-ethyl)-(dimethylamino-3-propyl)-ether, (dimethylamino-2-ethyl)-(diethylamino-3-propyl)-ether, (diethylamino-2-ethyl)-(diethylamino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, N-isopropyl-N-(3-methoxypropyl)-1-amino-2-butanol, 1-(4-morpholino)-2-(methylisopropylamino)-ethane, 1-(4-morpholino)-2-(methyltertiobutylamino)-ethane, 1-(4-morpholino)-2-(diisopropylamino)-ethane, 1-(4-morpholino)-2-(1-piperidinyl)-ethane, individually or as a mixture.

Preferably the sterically hindered secondary amine or amines are chosen from N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

The so-called primary or secondary "activator" amines may be chosen for example from the following compounds:
Monoethanolamine,
Diethanolamine,
N-butylethanolamine,
Aminoethylethanolamine,
Diglycolamine,
Piperazine,
1-Methylpiperazine,
2-Methylpiperazine,
N-(2-hydroxyethyl)piperazine,
N-(2-aminoethyl)piperazine,
Morpholine,
3-(methylamino)propylamine,
1,6-hexanediamine and all its variously N-alkylated derivatives, such as for example N,N'-dimethyl-1,6-hexanediamine, N-methyl-1,6-hexanediamine or N,N', N'-trimethyl-1,6-hexanediamine.

According to a first embodiment, the aqueous solution of amines contains between 10% and 90 wt. % of a primary amine, preferably between 20% and 60 wt. %, more preferably between 25% and 50 wt. %; the solution contains between 10% and 90 wt. % of water, preferably between 40% and 80 wt. % of water, and more preferably between 50% and 75 wt. % of water.

According to a second embodiment, the aqueous solution of amines contains between 10% and 90 wt. % of a secondary amine, preferably between 20% and 60 wt. %, most preferably between 25% and 50 wt. %; the solution contains between 10% and 90 wt. % of water, preferably between 40% and 80 wt. % of water, most preferably between 50% and 75 wt. % of water.

According to a third embodiment, the aqueous solution of amines contains between 10% and 90 wt. % of a tertiary amine, preferably between 20% and 60 wt. %, most preferably between 25% and 50 wt. %; the solution contains between 10% and 90 wt. % of water, preferably between 40% and 80 wt. % of water, most preferably between 50% and 75 wt. % of water; and the solution contains 0.5% to 30 wt. % of the said activator, preferably 0.5% to 15 wt. %, and most preferably 0.5% to 10 wt. %.

According to a fourth embodiment, the aqueous solution of amines contains between 10% and 90 wt. % of a sterically hindered secondary amine, preferably between 20% and 60 wt. %, most preferably between 25% and 50 wt. %; the solution contains between 10% and 90 wt. % of water, preferably between 40% and 80 wt. % of water, and most preferably between 50% and 75 wt. % of water; and the solution contains 0.5% to 30 wt. % of the said activator, preferably 0.5% to 15 wt. %, and most preferably 0.5% to 10 wt. %.

The stage b2) involving the removal of the acid gases comprises a first absorption stage of the acid compounds of the synthesis gas to be treated by contacting this gas with the solvent in an absorber operating at the pressure of the gas to be treated, followed by a regeneration stage of the solvent, generally carried out at a pressure slightly greater than atmospheric pressure. The said extraction stage of the acid gases may advantageously be carried out in an absorption column for the acid gases. The absorption column may advantageously be provided with any type of internals promoting gas/liquid contact known to the person skilled in the art, such as plates, random packings, structured packings, the solvent being distributed at the top of the said column and the gas circulating in counter-current in the latter. The said solvent regeneration stage may advantageously be carried out in order to reduce the consumption of solvent in the unit, which can thus be regenerated, and is generally performed in a column equipped at the bottom with a reboiler and at the top with a condenser, enabling the acid compounds released by the regeneration to be cooled. This thermal regeneration stage generally operates at a pressure slightly greater than atmospheric pressure, generally between 1 and 5 bar, preferably between 1.5 and 3 bar. The temperature at the bottom of the column is generally between 100 and 160° C., more preferably between 100 and 140° C. The regeneration column may advantageously be equipped with all types of internals promoting gas/liquid contact known to the person skilled in the art, such as plates, random packings or structured packings. This regeneration stage may advantageously be carried out in two stages so as to remove on the one hand a gaseous flow rich in $CO_2$ and on the other hand a gaseous flow rich in $H_2S$.

According to another embodiment this regeneration stage may advantageously include a partial regeneration stage of the solvent by expansion to an absolute pressure slightly greater than atmospheric pressure, generally between 1 and 10 bar, preferably between 1 and 5 bar, the partially regenerated solvent then being able to be reintroduced into the absorption column at an intermediate level between the top and the bottom of the column.

The absorption stage of the acid gases is advantageously carried out at an absolute pressure between 20 and 120 bar, preferably between 25 and 60 bar, and more preferably between 30 and 50 bar. The absorption stage of the acid gases is advantageously carried out at a temperature between 20 and 100° C., preferably between 30 and 80° C.

According to the invention, the gaseous effluent leaving the stage b2) is depleted in $H_2S$ and $CO_2$. Preferably the said gaseous effluent leaving the stage b2) contains less than 5 vol % of $CO_2$, preferably less than 1 vol % of $CO_2$, and less than 50 ppmv of $H_2S$, preferably less than 10 ppmv of $H_2S$, preferably less than 5 ppmv of $H_2S$, and preferably less than 1 ppmv of $H_2S$.

Advantageously the gaseous effluent leaving the stage b2) contains less than 20 ppmv of COS, preferably less than 10 ppmv of COS, preferably less than 5 ppmv of COS and preferably less than 2 ppmv of COS, and less than 10 ppmv of HCN, preferably less than 5 ppmv of HCN, and preferably less than 1 ppmv of HCN.

The relative amounts of CO and $H_2$ in the gaseous effluent are identical to those in the gas flow leaving the stage b1) that feeds the stage b2).

c1) Stage c1) of the Catalytic Hydrolysis of the Compounds COS and HCN

According to the process of the invention, the complementary part leaving the stage a) is subjected to a stage involving the catalytic hydrolysis of COS and HCN to $H_2S$ and $NH_3$ (stage c1). This stage allows the partial removal of COS and HCN, which are poisons for the Fischer-Tropsch synthesis catalyst. In addition the implementation of the catalytic hydrolysis stage c1) allows a more thorough removal of COS and HCN when combined with the stage c2) located downstream for removing the acid gases. Furthermore, by carrying out the hydrolysis of HCN during this stage the solvent employed in the stage c2) located downstream is also protected against a degradation of the reactive amines, which could possibly be caused by the presence of HCN.

The stage c1) for the catalytic hydrolysis of carbonyl sulphide (COS) and hydrogen cyanide (HCN) is according to the invention advantageously carried out in the presence of a catalyst containing a platinum-based compound, or an oxide of an element chosen from the group comprising titanium, zirconium, aluminium, chromium, zinc or mixtures thereof.

Preferably the hydrolysis catalyst is a catalyst based on titanium oxide. The catalyst used may also contain at least alkali metals, alkaline earth metals and/or rare earth metals, obtained for example from precursors such as potassium hydroxide, sodium hydroxide, sodium or barium carbonate, sodium or barium bicarbonate, calcium sulphate, sodium or barium acetate, sodium or barium oxalate. The hydrolysis stage is advantageously carried at temperatures between 100 and 400° C., preferably between 200 and 350° C.

Advantageously the catalytic hydrolysis stage c1) of COS and HCN is carried out at absolute pressure between 20 and 120 bar, preferably between 25 and 60 bar, and more preferably between 30 and 50 bar.

The synthesis gas at the outlet from the hydrolysis unit of stage c1) contains between 5 and 65 vol % v of CO, preferably between 10 and 50 vol % of CO, more preferably between 12 and 45 vol % of CO, and between 1 and 65 vol % of $H_2$, preferably between 3 and 50 vol % of $H_2$, and more preferably between 5 and 35 vol % of $H_2$, and between 1 and 50 vol % of $CO_2$, preferably between 5 and 45 vol % of $CO_2$, and more preferably between 10 and 40 vol % of $CO_2$.

Advantageously the effluent at the outlet of the hydrolysis unit of stage c1) contains less than 25 ppm by volume of COS, preferably less than 10 ppm by volume of COS, and more preferably less than 5 ppm by volume of COS, and less than 5 ppm by volume of HCN, more preferably less than 1 ppm by volume of HCN, and more preferably less than 0.5 ppm by volume of HCN.

According to another embodiment, the catalytic hydrolysis stage c1) of the compounds COS and HCN present in the second synthesis gas flow leaving the stage a) may advantageously be employed in stage c2) for the removal of the acid gases of the said second synthesis gas flow. This embodiment is described in the patent FR 2950265.

Washing the Effluent Leaving the Stage c1) with Water

In a preferred embodiment the effluent leaving the stage c1) is washed with water. This wash stage with water has the advantage of removing the water-soluble impurities such as $NH_3$ and HCl and that are particularly harmful for the operation of the stage c2) involving the removal of the acid gases.

c2) Stage c2) for the Removal of the Acid Gases from the Synthesis Gas Flow Leaving the Hydrolysis Stage c1) of COS and HCN In accordance with the invention, in parallel to the stages b1) and b2), the second synthesis gas flow leaving the stage c1) and enriched with CO undergoes a stage for the removal of the acid gases by contacting the said flow with an aqueous solution of amines containing at least one tertiary amine, so as to produce at least one gaseous effluent containing less than 10 vol % of carbon dioxide $CO_2$, preferably less than 5 vol % of $CO_2$, and less than 50 ppmv of $H_2S$, preferably less than 10 ppmv of $H_2S$, preferably less than 5 ppmv of $H_2S$, and preferably less than 1 ppmv of $H_2S$.

The composition of the second synthesis gas flow leaving the stage c1) and rich in CO, requires the use in the said stage c2) of a suitable aqueous solution of amines. In particular, an aqueous solution of amines that is slightly sensitive or insensitive to the presence of CO should be used. Accordingly an aqueous solution of tertiary amine that does not allow a direct reaction with CO will be preferred.

Preferably the tertiary amine or amines are chosen from methyldiethanolamine (MDEA), triethanolamine, ethyldiethanolamine, diethylethanolamine, dimethylethanolamine, 1-methyl-4-(3-dimethylaminopropyl)-piperazine, 1-ethyl-4-(diethylaminoethyl)-piperazine, 1-methyl-4-hydroxy-piperidine, 1-methyl-2-hydroxymethyl-piperidine, tert-butyldiethanolamine, 1,2-bis-(2-dimethylaminoethoxy)-ethane, Bis (dimethylamino-3-propyl)ether, Bis(diethylamino-3-propyl) ether, (dimethylamino-2-ethyl)-(dimethylamino-3-propyl)-ether, (diethylamino-2-ethyl)-(dimethylamino-3-propyl)-ether, (dimethylamino-2-ethyl)-(diethylamino-3-propyl)-ether, (diethylamino-2-ethyl)-(diethylamino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, N-isopropyl-N-(3-methoxypropyl)-1-amino-2-butanol, 1-(4-morpholino)-2-(methylisopropylamino)-ethane, 1-(4-morpholino)-2-(methyltertiobutylamino)-ethane, 1-(4-morpholino)-2-(diisopropylamino)-ethane, 1-(4-morpholino)-2-(1-piperidinyl)-ethane, individually or as a mixture.

According to a preferred embodiment the aqueous solution of amines contains between 10% and 90 wt. % of a tertiary amine, preferably between 20% and 60 wt. %, and most preferably between 25% and 50 wt. %; the solution contains between 10% and 90 wt. % of water, preferably between 40% and 80 wt. % of water, and most preferably 50% to 75 wt. % of water.

Since the absorption kinetics of $CO_2$ in an aqueous solution of tertiary amine is fairly slow, there is a selectivity between the absorption of $H_2S$ and the absorption of $CO_2$, which enables an acid gas enriched in $H_2S$ to be obtained.

The stage c2) for the removal of the acid gases comprises a first absorption stage of the acid compounds of the synthesis gas to be treated by contacting this gas with the solvent in an absorber operating at the pressure of the gas to be treated, followed by a regeneration stage of the solvent, generally operating at a pressure slightly greater than atmospheric pressure.

The said extraction stage of the acid gases may advantageously be employed in an absorption column for acid gases. The absorption column may advantageously be equipped with any type of internals promoting gas/liquid contact known to the person skilled in the art, such as plates, random packings or structured packings, the solvent being distributed at the top of the said column and the gas circulating in counter-current in the latter. The said solvent regeneration stage may advantageously be employed in order to reduce the consumption of solvent in the unit, which may thus be regenerated, and is generally carried out in a column equipped at the bottom with a reboiler and at the top with a condenser, enabling the acid compounds released by the regeneration to be cooled. This thermal regeneration stage generally operates at a pressure slightly greater than atmospheric pressure, generally between 1 and 5 bar, preferably between 1.5 and 3 bar. The temperature at the bottom of the column is generally between 100 and 160° C., more preferably between 100 and 140° C. The regeneration column may advantageously be equipped with any type of internals promoting gas/liquid contact known to the person skilled in the art, such as plates, random packings or structured packings. This regeneration stage may advantageously be performed in two stages so as to remove on the one hand a gaseous flow rich in $CO_2$ and on the other hand a gaseous flow rich in $H_2S$.

According to another embodiment this regeneration stage may advantageously include a partial regeneration stage of the solvent by expansion to an absolute pressure slightly greater than atmospheric pressure, generally between 1 and 10 bar, preferably between 1 and 5 bar, the partially regenerated solvent then being able to be reintroduced into the absorption column at an intermediate level between the top and the bottom of the column.

The absorption stage of the acid gases is advantageously carried out an absolute pressure between 20 and 120 bar, preferably between 25 and 60 bar, and still more preferably between 30 and 50 bar. The absorption stage of the acid gases is advantageously carried out at a temperature between 20 and 100° C., preferably between 30 and 80° C.

The said stage c2) enables a gaseous effluent depleted in $H_2S$ and $CO_2$ to be produced. Preferably the said gaseous effluent leaving the stage c2) contains less than 10 vol % of $CO_2$, preferably less than 5 vol % of $CO_2$, and less than 50 ppmv of $H_2S$, preferably less 10 ppmv of $H_2S$, preferably less than 5 ppmv of $H_2S$, and preferably less than 1 ppmv of $H_2S$.

Advantageously the gaseous effluent leaving the said stage c2) contains less than 20 ppmv of COS, preferably less than 10 ppmv of COS, more preferably less than 5 ppmv of COS, preferably less than 2 ppmv of COS, and less than 10 ppmv of HCN, preferably less than 5 ppmv of HCN, and preferably less than 1 ppmv of HCN.

The relative amounts of CO and $H_2$ in the gaseous effluent are identical to those of the gas flow leaving the stage c1) that feeds the stage c2).

According to a preferred embodiment, the aqueous solution of amines used in the absorption stage may already be partially loaded with acid gases if it is derived in particular from the absorption stage of an Acid Gas Enrichment Unit or from a Tail Gas Treating Unit downstream a Claus Unit.

According to another preferred embodiment, the regeneration stage may advantageously be combined with a regeneration stage of an Acid Gas Enrichment Unit or a Tail Gas Treating Unit.

d) Recombination Stage d) of the Effluents

In accordance with the invention, at least part and preferably all the gaseous effluents leaving the stages b2) and c2) are recombined so as to obtain a purified synthesis gas.

The purified synthesis gas leaving the recombination stage d) contains less than 5 vol % of carbon dioxide $CO_2$, preferably less than 2 vol % of $CO_2$.

Advantageously, the purified synthesis gas leaving the recombination stage d) contains less than 50 ppmv of $H_2S$, preferably less than 10 ppmv of $H_2S$, preferably less than 5 ppmv of $H_2S$, preferably less than 1 ppmv of $H_2S$, and also contains residual amounts of COS and HCN, namely less than 20 ppmv of COS, preferably less than 10 ppmv of COS, preferably less than 5 ppmv of COS, most preferably less than 2 ppmv of COS, and less than 10 ppmv of HCN, preferably less than 5 ppmv of HCN, and preferably less than 1 ppmv of HCN.

In addition the synthesis gas leaving the recombination stage d) contains $H_2$ and CO, and advantageously has a $H_2$/CO molar ratio preferably between 0.5 and 4, preferably between 1 and 3, most preferably between 1.5 and 2.5.

e) Final Purification Stage

The purified synthesis gas leaving the recombination stage d) may still contain impurities that it may be advisable to remove depending on the specifications of the processes located downstream. In particular, the synthesis gas leaving the stage d) contains less than 50 ppmv of $H_2S$, preferably less than 10 ppmv of $H_2S$, preferably less than 5 ppmv of $H_2S$, most preferably less than 1 ppmv of $H_2S$, and also contains residual amounts of COS and HCN, preferably less than 20 ppmv of COS, preferably less than 10 ppmv of COS, still more preferably less than 5 ppmv of COS, most preferably less than 2 ppmv of COS, and less than 10 ppmv of HCN, preferably less than 5 ppmv of HCN, preferably less than 1 ppmv of HCN. In addition the synthesis gas may also contain less than 20 ppmv of $NH_3$, preferably less than 10 ppmv of $NH_3$, preferably less than 5 ppmv of $NH_3$, most preferably less than 2 ppmv of $NH_3$, as well as heavy metals such as lead, arsenic and mercury.

According to a variant of the process, the said purified synthesis gas may possibly undergo a final purification stage e) by flowing through at least one guard bed and/or in a catalytic reactor. The said stage enables the last traces of impurities remaining in the purified synthesis gas to be completely removed, such as halogenated compounds, $H_2S$, COS, HCN and $NH_3$, and heavy metals such as lead, arsenic and mercury. The final purification stage is carried out by any means known to the person skilled in the art, for example on at least one guard bed based on oxides and/or zinc sulphide, Cu/ZnO, activated carbon, and/or a hydrolysis catalyst for COS and HCN such as an alumina, a titanium oxide, a zirconia, a compound of chromium, individually or as a mixture.

In a preferred embodiment the gaseous effluent is washed with water. This wash stage with water has the advantage of removing the water-soluble impurities such as $NH_3$ and HCl that are particularly harmful to the Fischer-Tropsch synthesis stage.

Advantageously the final purification stage e) is carried out at an absolute pressure between 20 and 120 bar, preferably between 25 and 60 bar and more preferably between 30 and 50 bar.

The synthesis gas contains, on leaving the final purification stage, a total sulphur content of less than 10 ppb by volume, preferably less than 5 ppbv, more preferably less than 2 ppbv, an HCN content less than 10 ppb by volume, preferably less than 5 ppbv, more preferably less than 2 ppbv, and an $NH_3$ content less than 1 ppm by volume, preferably less than 0.5 ppmv, more preferably less than 0.1 ppmv.

According to a particular embodiment the process according to the invention may be used for the treatment and purification of gases employed in chemical synthesis units, such as for example in the context of the methanol synthesis. In the chemical synthesis units the synthesis gases are generally employed at a pressure between 10 and 150 bar, preferably 50 to 100 bar, at a temperature between 150 and 300° C., preferably between 220 and 280° C.

According to another embodiment, the process according to the invention may be used for the treatment and purification of gases used in cogeneration installations. In the cogeneration installations the synthesis gases are generally used at a pressure between 1 and 150 bar, preferably 15 to 50 bar, and at a temperature between 100 and 450° C., preferably between 170 and 350° C.

In a preferred embodiment of the invention, the synthesis gas leaving the purification process according to the invention is routed to a Fischer-Tropsch synthesis stage f).

f) Fischer-Tropsch Catalytic Synthesis Reaction Stage f)

According to the process of the invention, the Fischer-Tropsch synthesis stage f) of the process is carried out starting with a feed containing the effluent leaving the stage e) and enabling a flow to be obtained containing liquid synthesis hydrocarbons and at least one gaseous effluent. Advantageously the feed of the Fischer-Tropsch synthesis stage f) contains carbon monoxide and hydrogen in a $H_2/CO$ molar ratio between 0.5 and 4, preferably between 1 and 3, more preferably between 1.5 and 2.5.

The Fischer-Tropsch synthesis stage f) is carried out in a reaction unit containing one or more suitable reactors, whose technology is known to the person skilled in the art. This may include for example multitubular fixed bed reactors, or slurry bubble column type reactors, or microchannel reactors.

According to a preferred embodiment of the invention, the stage f) employs one or more slurry bubble column type reactors. Since the synthesis is extremely exothermic, this embodiment enables, inter alia, the thermal control of the reactor to be improved and the loss of feedstock to be kept to a minimum.

The catalyst used in this Fischer-Tropsch synthesis stage f) is generally any catalytic solid known to the person skilled in the art and enabling the Fischer-Tropsch synthesis to be carried out. Preferably the catalyst used in the said stage contains cobalt or iron, more preferably cobalt. The catalyst employed in the stage f) is generally a supported catalyst. The support may for example be based on alumina, silica or titanium.

The temperature and pressure conditions are variable and adapted to the catalyst used in the stage f). The absolute pressure is generally between 10 and 60 bar, preferably between 50 and 35 bar and preferably between 20 and 30 bar. The temperature may generally be between 170 and 280° C., preferably between 190 and 260° C. and preferably between 210 and 240° C.

DESCRIPTION OF THE FIGURES

FIG. 4 is described in detail in Example 1.

Figure 1:
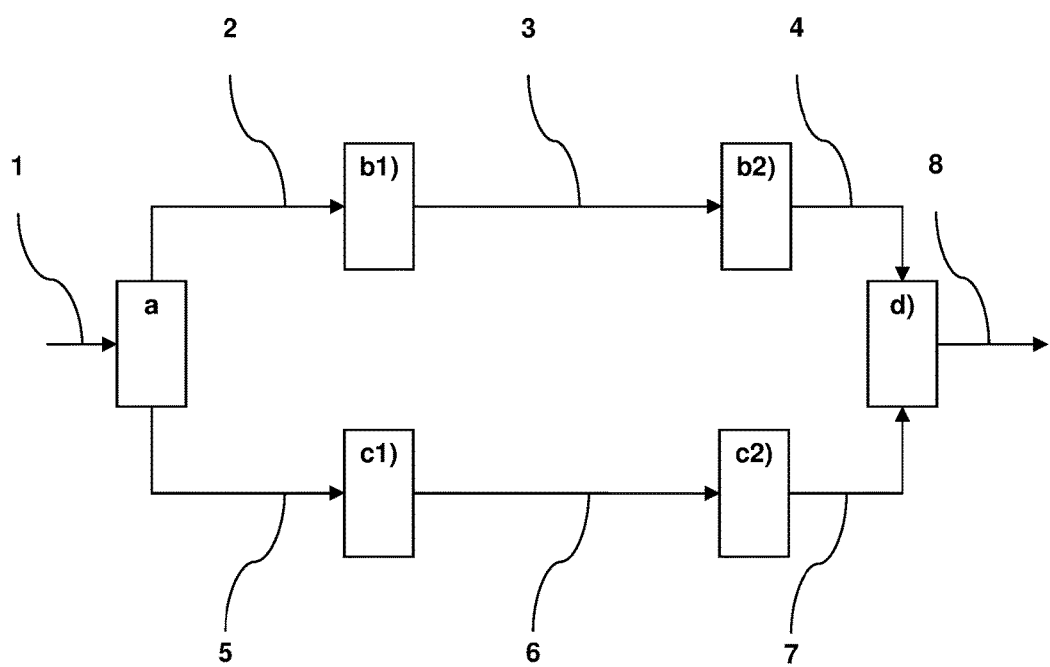
FIG. 1 represents the general reaction scheme of the process according to the invention, in which a synthesis gas (1) is divided in a separation zone (a) into two effluents (2) and (5), the effluent (2) undergoing a stage of conversion of carbon monoxide with steam in unit b1), and the effluent (5) undergoing a catalytic hydrolysis stage of COS and HCN in unit c1). The effluents (3) and (6) leaving respectively the units b1) and c1) undergo respectively a stage involving the removal of acid gases b2) and c2), and the effluents leaving the units b2) and c2) are recombined in unit d) to produce a purified synthesis gas (8).
Figure 2:
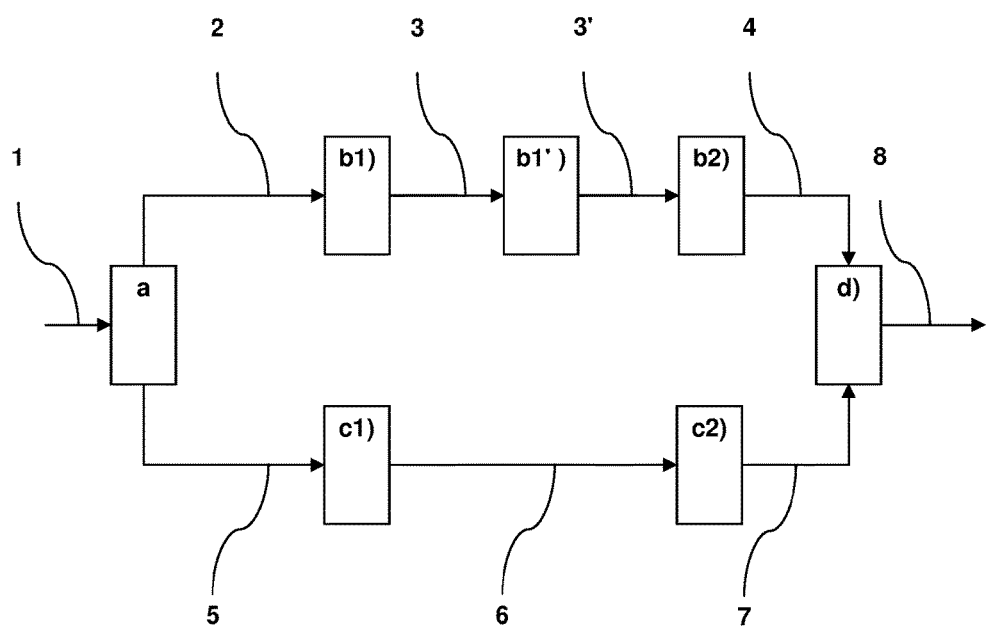
FIG. 2 represents the general reaction scheme of the process according to the invention, in another embodiment in which the effluent leaving the unit b1) is routed via line (3) to unit b1') for the hydrolysis of COS and HCN, the effluent leaving unit b1') is next routed via line (3') to the stage b2) for removing acid gases.
Figure 3:
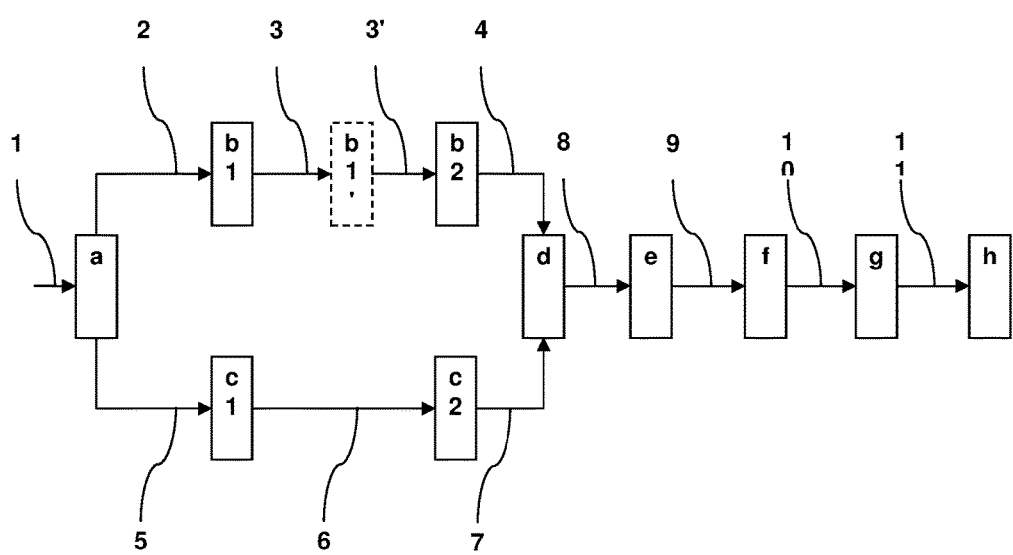
FIG. 3 represents the general reaction scheme of the process according to the invention, in another embodiment according to which the effluent (8) leaving the recombination unit d) of the synthesis gas flows is routed to a final purification unit e) in order to produce a purified synthesis gas via the line (9) and then to a Fischer-Tropsch hydrocarbon synthesis unit f).

Other advantages, details and characteristics of the invention will appear more clearly in the description of three embodiments illustrated in FIGS. 1, 2 and 3. These embodiments are given by way of example and are not intended to restrict the invention. This illustration of the process of the invention does not include all the components necessary for its implementation. Only the elements necessary for the understanding of the invention are included here, the person skilled in the art being able to supplement this representation in order to implement the invention.

EXAMPLES

Example 1: Purification of a Synthesis Gas According to the Prior Art

Figure 4:
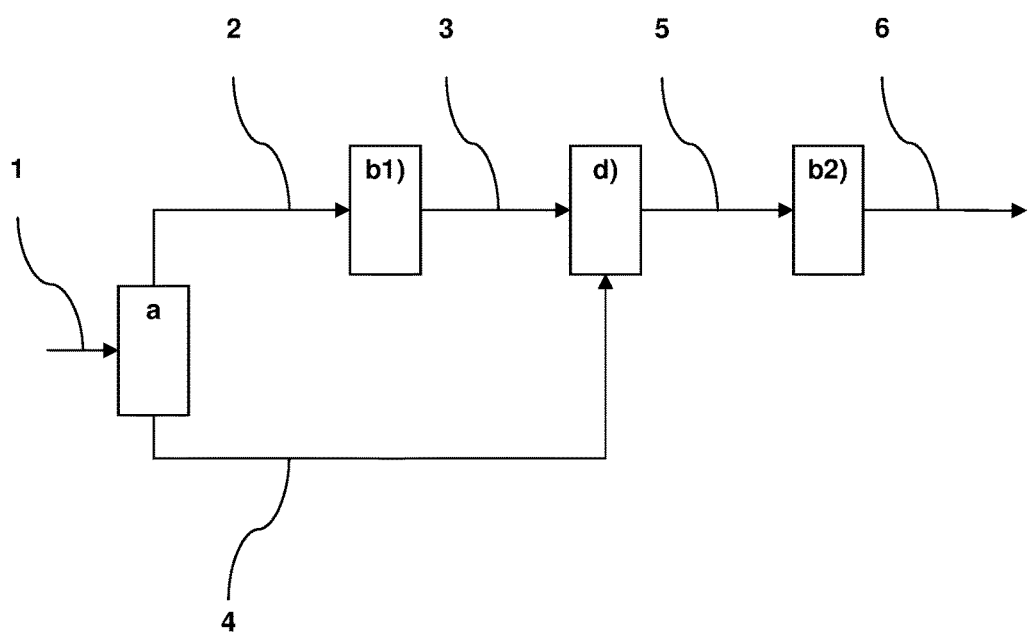
FIG. 4 represents a scheme involving a sequence of processes according to the prior art, according to which a removal stage of the acid gases is carried out on the gas flows after the recombination stage d).

FIG. 4 describes a process sequence according to the prior art. In FIG. 4 the stage a) corresponds to a separation stage of the synthesis gas no. 1, into two gas flows of identical composition no. 2 and no. 4, the gas flow no. 2 being routed to a stage b1) for converting carbon monoxide CO with steam to give a gas flow no. 3, the gas flows no. 3 and no. 4 being recombined in the recombination stage d) to give the gas flow no. 5, the gas flow no. 5 then being subjected to a stage b1) for removing acid gases to give a gas flow no. 6.

Total gas flow rate (flow no. 1): 453 000 Nm$^3$/h
Gas flow rate to stage b1) (flow no. 2): 232 000 Nm$^3$/h
Gas flow rate bypassing stage b1) (flow no. 4): 221 000 Nm$^3$/h Stage b1) for Conversion of CO with Steam The catalyst C1 that is used is an industrial catalyst based on cobalt and molybdenum. This industrial catalyst has a content of metallic cobalt of 2.2 wt. % and of metallic molybdenum of 8.3 wt. %. Its specific surface determined by the BET method is 196 m$^2$/g. This catalyst is used in its sulfided form. The catalyst is available in the form of extrudates of about 3 mm in diameter.

The gaseous feedstock having the composition described in Table 1 (flow no. 2) is injected into a fixed bed reactor charged with catalyst C1. The selected operating conditions are the following:

gas hourly space velocity GHSV (feedstock volume/catalyst volume/hour)=3000 h$^{-1}$
absolute operating pressure: 26 bar
inlet temperature of the catalytic bed: 250° C.
temperature of the catalytic bed: 350° C.

The analysis follow-up at the reactor outlet enabled the carbon monoxide conversion to be determined. The experimental results are given in Table 1 (composition of the outlet flow no. 3).

Stage b2) Removal of Acid Gases

According to the prior art, the synthesis gas is purified by washing with an aqueous solution of amines in order to remove $CO_2$ and $H_2S$. By using an aqueous solution of activated methyldiethanolamine (MDEA) containing 38 wt. % of methyldiethanolamine (MDEA), 8 wt. % of diethanolamine (DEA) and 54 wt. % of water, the flow rate of solvent required to purify 270 000 Nm$^3$/h of gas is 1640 Sm$^3$/h under the following operating conditions in the absorber:

Temperature: 45° C.
Pressure: 26 bar

The residual amounts of acid compounds in the gas leaving the acid gas removal stage b1) according to the prior art are: for $H_2S$ 1 ppmv, for $CO_2$ 10 ppmv and for COS 50 ppmv.

The evolution of the composition of the gas is detailed in Table 1 below:

The nos. of the flows refer to FIG. 4.

TABLE 1 composition of the synthesis gas to be purified.

| | Flow no 1, no 2, no 4 | Flow no 3 | Flow no 5 | Flow no 6 |
|---|---|---|---|---|
| $H_2$ (% v) | 14.6 | 39.6 | 27.4 | 63.4 |
| CO (% v) | 25.7 | 2.0 | 13.6 | 31.5 |
| $CO_2$ (% v) | 6.6 | 31.5 | 19.4 | 0.001 |
| $H_2O$ (% v) | 50.8 | 24.6 | 37.4 | 0.25 |
| $H_2S$ (ppm vol) | 4300 | 4750 | 4530 | 1 |
| COS (ppm vol) | 480 | 30 | 250 | 145 |
| HCN (ppm vol) | 200 | 1 | 100 | 15 |
| $NH_3$ (ppm vol) | 650 | 850 | 750 | 10 |
| $H_2$/CO | 0.6 | 19.8 | 2.0 | 2.0 |

Example 2: Purification of a Synthesis Gas According to the Invention

FIG. 1 describes a sequence of processes according to the invention.

Total gas flow rate (flow no. 1): 453 000 Nm$^3$/h
Flow rate of gas to stage b1) (flow no. 2): 232 000 Nm$^3$/h
Flow rate of gas to stage c1) (flow no. 5): 221 000 Nm$^3$/h Stage b1) for Conversion of CO with Steam The catalyst C1 used is an industrial catalyst based on cobalt and molybdenum. This industrial catalyst has a content of metallic cobalt of 2.2 wt. % and of metallic molybdenum of 8.3 wt. %. Its specific surface determined by the BET method is 196 m$^2$/g. This catalyst is used in its sulfided form. The catalyst exists in the form of extrudates about 3 mm in diameter.

The gaseous feedstock with the composition described in Table 2 (flow n° 2) is injected into a fixed bed reactor charged with catalyst C1. The selected operating conditions are:

gas hourly space velocity GHSV (feedstock volume/catalyst volume/hour)=3000 h$^{-1}$
absolute operating pressure: 26 bar
inlet temperature of the catalyst bed: 250° C.
temperature of the catalyst bed: 350° C.

The analysis follow-up at the reactor outlet enabled the carbon monoxide conversion to be determined. The experimental results are given in Table 2 (composition of the outlet flow no. 3).

Stage b2) Removal of Acid Gases

According to the invention, the synthesis gas leaving the stage b1) is purified by washing with an aqueous solution of activated methyldiethanolamine (MDEA) containing 38 wt. % of methyldiethanolamine (MDEA), 8 wt. % of diethanolamine (DEA) and 54 wt. % of water, and the flow rate of solvent required to purify 168 000 Nm$^3$/h of gas is 1340 Sm$^3$/h under the following operating conditions in the absorber:

temperature: 45° C.
pressure: 26 bar

Stage c1) Hydrolysis of COS and HCN

The catalyst C2 used is an industrial catalyst based on titanium oxide. This industrial catalyst has a content of titanium oxide of 85 wt. %. Its specific surface determined by the BET method is 120 m$^2$/g. The catalyst exists in the form of extruded pellets about 3 mm in diameter.

The gaseous feedstock having the composition described in Table 2 (flow no. 5) is injected into a fixed bed reactor charged with catalyst C2. The selected operating conditions are:

gas hourly space velocity GHSV (feedstock volume/catalyst volume/hour)=1500 h$^{-1}$
absolute operating pressure: 26 bar
temperature of the catalyst bed: 250° C.

The analysis follow-up at the reactor outlet enabled the conversions of COS and HCN to be determined. The experimental results are given in Table 2 (composition of the outlet flow no. 6).

Stage c2) Removal of Acid Gases

According to the invention, the synthesis gas leaving the stage c1) is purified by washing with an aqueous solution of methyldiethanolamine (MDEA) containing 45 wt. % of methyldiethanolamine (MDEA) and 55 wt. % of water, and the flow rate of solvent required to purify 102 000 Nm$^3$/h of gas is 200 Sm$^3$/h under the following operating conditions in the absorber:

temperature: 50° C.
pressure: 26 bar

In Table 2 the Flow Nos. Refer to FIG. 1

TABLE 2

Composition of the synthesis gas to be purified.

|  | Flow n °1, n °2, n °5 | Flow n °3 | Flow n °4 | Flow n °6 | Flow n °7 | Flow n °8 |
|---|---|---|---|---|---|---|
| $H_2$ (% v) | 14.6 | 39.6 | 90.2 | 14.6 | 30.7 | 60.0 |
| CO (% v) | 25.7 | 2.0 | 4.6 | 25.7 | 54.0 | 29.7 |
| $CO_2$ (% v) | 6.6 | 31.5 | 0.001 | 6.6 | 5.0 | 2.5 |
| $H_2O$ (% v) | 50.8 | 24.6 | 0.25 | 50.8 | 0.25 | 0.25 |
| $H_2S$ (ppm vol) | 4300 | 4750 | 1 | 4775 | 1 | 1 |
| COS (ppm vol) | 480 | 30 | 17 | 3 | 3 | 10 |
| HCN (ppm vol) | 200 | 1 | 1 | 1 | 1 | 1 |
| $NH_3$ (ppm vol) | 650 | 850 | 10 | 850 | 10 | 10 |
| $H_2$/CO | 0.6 | 19.8 | 19.8 | 0.6 | 0.6 | 2.0 |

TABLE 3

Flow rates of solvents used for Example 1 according to the prior art, and for Example 2 according to the invention.

|  | Example 1 according to the prior art | Example 2 according to the invention |
|---|---|---|
| Flow rate of solvent stage b2) | 1640 Sm³/h | 1340 Sm³/h |
| Flow rate of solvent stage c2) | — | 200 Sm³/h |

For the same overall flow rate of synthesis gas of 270,000 Nm³/h, the purification scheme according to the invention requires a flow rate of 200 Sm³/h of MDEA in stage c2) and a flow rate of 1340 Sm³/h of activated MDEA in stage b2). The process according to the invention thus enables the overall flow rate of solvent used to be reduced by 6%. The energy consumptions required for the regeneration of the aqueous solutions of amines are also reduced in the same proportions. The residual amounts of acid components in the gas leaving the wash stage are:

For $H_2S$ 1 ppmv, for COS 10 ppmv, and for HCN 1 ppmv, i.e. levels of impurities that are well below those obtained in Example 1 according to the prior art.

The obtained synthesis gas has a $H_2$/CO ratio equal to 2.

Example 3: Purification of a Synthesis Gas According to the Invention

FIG. 2 describes a sequence of processes according to the invention.

Total Flow rate of gas (flow no. 1): 453 000 Nm³/h
Flow rate of gas to stage b1) (flow no. 2): 232 000 Nm³/h
Flow rate of gas to stage c1) (flow no. 5): 221 000 Nm³/h Stage b1) Conversion of CO with Steam The catalyst C1 that is used is an industrial catalyst based on cobalt and molybdenum. This industrial catalyst has a content of metallic cobalt of 2.2 wt. % and of metallic molybdenum of 8.3 wt. %. Its specific surface determined by the BET method is 196 m²/g. This catalyst is used in its sulfided form. The catalyst exists in the form of extrudates about 3 mm in diameter.

The gaseous feedstock having the composition described in Table 4 (flow no. 2) is injected into a fixed bed reactor charged with catalyst C1. The selected operating conditions are:

gas hourly space velocity GHSV (feedstock volume/catalyst volume/hour)=3000 h$^{-1}$
absolute operating pressure: 26 bar
inlet temperature of the catalyst bed: 250° C.
temperature of the catalyst bed: 350° C.

The analysis follow-up at the reactor outlet enabled the carbon monoxide conversion to be determined. The experimental results are given in Table 4 (composition of the outlet flow n° 3).

Stage b1') Hydrolysis of COS and HCN

The catalyst C2 that is used is an industrial catalyst based on titanium oxide. This industrial catalyst has a titanium oxide content of 85 wt. %. Its specific surface determined by the BET method is 120 m²/g. The catalyst exists in the form of extrudates about 3 mm in diameter.

The gaseous feedstock having the composition described in Table 4 (flow no. 3) leaving the stage b1) of CO conversion with steam is injected into a fixed bed reactor charged with catalyst C2. The selected operating conditions are:

gas hourly space velocity GHSV (feedstock volume/catalyst volume/hour)=1500 h$^{-1}$
absolute operating pressure: 26 bar
temperature of the catalyst bed: 250° C.

The analysis follow-up at the reactor outlet enabled the conversions of COS and HCN to be determined. The experimental results are given in Table 4 (composition of outlet flow no. 3')

Stage b2) Removal of Acid Gases

According to the invention, the synthesis gas leaving the stage b1) is purified by washing with an aqueous solution of activated methyldiethanolamine (MDEA) containing 38 wt. % of methyldiethanolamine (MDEA), 8 wt. % of diethanolamine (DEA) and 54 wt. % of water, and the flow rate of solvent required to purify 168 000 Nm³/h of gas is 1340 Sm³/h under the following operating conditions in the absorber:

Temperature: 45° C.
Pressure: 26 bar

Stage c1) Hydrolysis of COS and HCN

The catalyst C2 that is used is an industrial catalyst based on titanium oxide. This industrial catalyst has a titanium oxide content 85 wt %. Its specific surface determined by the BET method is 120 m²/g. The catalyst exists in the form of extrudates about 3 mm in diameter.

The gaseous feedstock having the composition described in Table 4 (flow no. 5) is injected into a fixed bed reactor charged with catalyst C2. The selected operating conditions are:

gas hourly space velocity GHSV (feedstock volume/catalyst volume/hour)=1500 h$^{-1}$
absolute operating pressure: 26 bar
temperature of the catalyst bed: 250° C.

The analysis follow-up at the reactor outlet enabled the conversions of COS and HCN to be determined. The experimental results are given in Table 4 (composition of the outlet flow n° 3).

Stage c2) Removal of Acid Gases

According to the invention the synthesis gas leaving the stage c1) is purified by washing with an aqueous solution of MDEA containing 45 wt. % of MDEA and 55 wt. % of water, and the flow rate of solvent required to purify 102 000 Nm³/h of gas is 200 Sm³/h under the following operating conditions in the absorber:
temperature: 50° C.
pressure: 26 bar
Table 4 Refers to FIG. 2.

TABLE 4 composition of the synthesis gas to be purified.

| | Flow n °1, n °2, n °5 | Flow n °3 | Flow n °3' | Flow n °4 | Flow n °6 | Flow n °7 | Flow n °8 |
|---|---|---|---|---|---|---|---|
| $H_2$ (% v) | 14.6 | 39.6 | 39.6 | 90.2 | 14.6 | 30.7 | 60.0 |
| CO (% v) | 25.7 | 2.0 | 2.0 | 4.6 | 25.7 | 54.0 | 29.7 |
| $CO_2$ (% v) | 6.6 | 31.5 | 31.5 | 0.001 | 6.6 | 5.0 | 2.5 |
| $H_2O$ (% v) | 50.8 | 24.6 | 24.6 | 0.25 | 50.8 | 0.25 | 0.25 |
| $H_2S$ (ppm vol) | 4300 | 4750 | 4770 | 1 | 4775 | 1 | 1 |
| COS (ppm vol) | 480 | 30 | 8 | 5 | 3 | 3 | 4 |
| HCN (ppm vol) | 200 | 1 | 1 | 1 | 1 | 1 | 1 |
| $NH_3$ (ppm vol) | 650 | 850 | 850 | 10 | 850 | 10 | 10 |
| $H_2$/CO | 0.6 | 19.8 | 19.8 | 19.8 | 0.6 | 0.6 | 2.0 |

TABLE 5

Flow rates of solvents used for Example 1 according to the prior art, and for Example 3 according to the invention.

| | Example 1 according to the prior art | Example 3 according to the invention |
|---|---|---|
| Flow rate of solvent stage b2) | 1640 Sm³/h | 1340 Sm³/h |
| Flow rate of solvent stage c2) | — | 200 Sm³/h |

For the same overall flow rate of synthesis gas of 270 000 Nm³/h, the purification scheme according to the invention requires a flow rate of 200 Sm³/h of MDEA in stage c2) and a flow rate of 1340 Sm³/h of activated MDEA in stage b2). The process according to the invention thus enables the overall flow rate of solvent to be reduced by 6%. The energy consumptions required for the regeneration of the aqueous solutions of amines are also reduced in the same proportions.

In the variant of the process according to the invention described in example 3, the residual amounts of acid compounds in the gas leaving the wash stage are: for $H_2S$ 1 ppmv, for COS 4 ppmv, and for HCN 1 ppmv, i.e. levels of impurities that are well below those obtained in Example 1 according to the prior art.

The synthesis gas obtained has a $H_2$/CO ratio of 2.

The invention claimed is:

1. A process for purification of synthesis gas, comprising at least the following stages:
   a) a stage for dividing the synthesis gas into at least a first synthesis gas flow and a second synthesis gas flow of the same composition,
   b1) a stage for the steam conversion of carbon monoxide of the first synthesis gas flow leaving stage a), in order to produce a stage b1) gaseous effluent containing at least hydrogen $H_2$ and carbon dioxide $CO_2$, less than 15% volume (vol. %) of carbon monoxide CO and acid gases including $H_2S$ and $CO_2$,
   b2) a stage for the removal of acid gases including $H_2S$ and $CO_2$ from the stage b1) gaseous effluent by contacting said stage b1) gaseous effluent with a solvent which is a first aqueous solution of amines comprising at least one secondary amine, said first aqueous solution of amines further comprising at least one tertiary amine or a sterically hindered secondary amine different from the secondary amine and containing at least one quaternary carbon atom in the α or alpha position of the nitrogen atom or two tertiary carbon atoms in the α and α' positions, so as to remove acid gases including $H_2S$ and $CO_2$ and produce at least one stage b2) gaseous effluent containing less than 5 vol. % of carbon dioxide $CO_2$, and less than 50 ppm by volume of $H_2S$,
   c1) a stage for catalytic hydrolysis of COS and HCN present in the second synthesis gas flow that has not undergone the conversion reaction of carbon monoxide with steam, in order to produce a stage c1) gaseous effluent containing less than 25 ppm by volume of COS, and less than 5 ppm by volume of HCN, and containing acid gases including $H_2S$ and $CO_2$,
   c2) a stage for removal of acid gases including $H_2S$ and $CO_2$ from said stage c1) gaseous effluent by contacting said stage c1) gaseous effluent with a solvent which is a second aqueous solution of amines containing at least one tertiary amine, so as to produce at least one stage c2) gaseous effluent containing less than 10 vol. % of carbon dioxide $CO_2$, and less than 50 ppmv of $H_2S$, wherein the second aqueous solution of amines contains between 25 and 50 wt. % of a tertiary amine and contains between 50 and 75 wt. % of water, and
   d) recombination of at least a part of said stage b2) effluent and at least part of said stage c2) to obtain a purified synthesis gas,
   wherein said first aqueous solution of amines and said second aqueous solution of amines are different.

2. The process according to claim 1, wherein stage b1) is carried out at an absolute pressure between 20 and 120 bar, at a gas hourly space velocity between 1,000 and 10,000 h¹, and at a temperature between 150 and 550° C.

3. The process according to claim 1, wherein stage b1) is conducted in the presence of a catalyst containing at least one element from group VIII and/or at least one element from group VIB of the Periodic Table, and a support chosen from aluminas, silica, and silica-aluminas.

4. The process according to claim 1, wherein said stage b1) gaseous effluent is routed to a stage b1') for catalytic hydrolysis of COS and HCN to $H_2S$ and $NH_3$ to obtain a stage b1') gaseous effluent which is sent to said stage b2).

5. The process according to claim 1, wherein the secondary amine or amines used in stage b2) are chosen from diethanolamine, diisopropanolamine, piperazine and derivatives thereof containing at least a non substituted nitrogen atom, morpholine and non N-substituted derivatives thereof, piperidine and non N-substituted derivatives thereof, N-(2'-hydroxyethyl)-2-amino-2-methyl-1-propanol, N-(2'-hydroxypropyl)-2-amino-2-methyl-1-propanol, and N-(2'-hydroxybutyl)-2-amino-2-methyl-1-propanol, individually or as a mixture.

6. The process according to claim 1, wherein said stage b2) is carried out in the presence of an aqueous solution of amines containing at least one secondary amine, mixed with at least one tertiary amine, wherein said tertiary amine or amines are chosen from methyldiethanolamine, triethanolamine, ethyldiethanolamine, diethylethanolamine, dimethylethanolamine, 1-methyl-4-(3-dimethylaminopropyl)-piperazine, 1-ethyl-4-(diethylaminoethyl)-piperazine, 1-methyl-4-hydroxy-piperidine, 1-methyl-2-hydroxymethyl-piperidine, tert-butyldiethanolamine, 1,2-bis-(2-dimethylaminoethoxy)-ethane bis(dimethylamino-3-propyl) ether, bis(diethylamino-3-propyl)ether, (dimethylamino-2-ethyl)-(dimethylamino-3-propyl)-ether, (diethylamino-2-ethyl)-(dimethylamino-3-propyl)-ether, (dimethylamino-2-ethyl)-(diethylamino-3-propyl)-ether, (diethylamino-2-ethyl)-(diethylamino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, N-isopropyl-N-(3-methoxypropyl)-1-amino-2-butanol, 1-(4-morpholino)-2-(methylisopropylamino)-ethane, 1-(4-morpholino)-2-(methyltertiobutylamino)-ethane, 1-(4-morpholino)-2-(diisopropylamino)-ethane, and 1-(4-morpholino)-2-(1-piperidinyl)-ethane, individually or as a mixture.

7. The process according to claim 1, wherein stage b2) is carried out in the presence of an aqueous solution of amines containing at least one secondary amine, mixed with at least one sterically hindered secondary amine containing at least one quaternary carbon atom in the α or alpha position of the nitrogen atom, or two tertiary carbon atoms in the α and α' position, and wherein the sterically hindered secondary amine or amines are chosen from N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol.

8. The process according to claim 1, wherein stage b2) is carried out in the presence of an aqueous solution of amines containing at least one secondary amine, mixed with at least one tertiary amine or a sterically hindered secondary amine containing at least one quaternary carbon atom in the α or alpha position of the nitrogen atom or two tertiary carbon atoms in the α and α' position, and wherein said primary and/or secondary amines are selected from diethanolamine, N-butylethanolamine, piperazine, 1-methylpiperazine, 2-methylpiperazine, N-(2-hydroxyethyl)piperazine, N-(2-aminoethyl)piperazine, morpholine, 3-(methylamino)propylamine, and 1,6-hexanediamine and N-alkylated derivatives thereof, individually or as a mixture.

9. The process according to claim 1, wherein stage c1) is carried out in the presence of a catalyst containing a compound based on platinum, or an oxide of an element selected from titanium, zirconium, aluminium, chromium and zinc, individually or as a mixture, said stage c1) being carried out at a temperature between 100 and 400° C., and at an absolute pressure between 20 and 120 bar.

10. The process according to claim 1, wherein the tertiary amine or amines used in the stage c2) are chosen from methyldiethanolamine, triethanolamine, ethyldiethanolamine, diethylethanolamine, dimethylethanolamine, 1-methyl-4-(3-dimethylaminopropyl)-piperazine, 1-ethyl-4-(diethylaminoethyl)-piperazine, 1-methyl-4-hydroxy-piperidine, 1-methyl-2-hydroxymethyl-piperidine, tert-butyldiethanolamine, 1,2-bis-(2-dimethylaminoethoxy)-ethane, bis(dimethylamino-3-propyl)ether, bis(diethylamino-3-propyl) ether, (dimethylamino-2-ethyl)-(dimethylamino-3-propyl)-ether, (diethylamino-2-ethyl)-(dimethylamino-3-propyl)-ether, (dimethylamino-2-ethyl)-(diethylamino-3-propyl)-ether, (diethylamino-2-ethyl)-(diethylamino-3-propyl)-ether, N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, N-isopropyl-N-(3-methoxypropyl)-1-amino-2-butanol, 1-(4-morpholino)-2-(methylisopropylamino)-ethane, 1-(4-morpholino)-2-(methyltertiobutylamino)-ethane, 1-(4-morpholino)-2-(diisopropylamino)-ethane, and 1-(4-morpholino)-2-(1-piperidinyl)-ethane, individually or as a mixture.

11. The process according to claim 1, wherein stages b2) and c2) each comprise a first absorption stage for absorption of the acid compounds of the synthesis gas by the solvent followed by a regeneration stage for regeneration of the solvent.

12. The process according to claim 11, wherein the first and second aqueous solutions of amines used in the absorption stage of stages b2) and c2), respectively, are in each case already partially loaded with acid gases and are derived from the absorption stage of an Acid Gas Enrichment Unit or from a Tail Gas Treating Unit downstream of a Claus Unit.

13. The process according to claim 12, wherein each of the regeneration stages of stages b2) and c2) is combined with a regeneration stage of an Acid Gas Enrichment Unit or a Tail Gas Treating Unit.

14. The process according to claim 1, further comprising subjecting said purified synthesis gas from stage d) to a final purification stage e).

15. The process according to claim 14, wherein purified synthesis gas leaving final purification step e) is routed to a Fischer-Tropsch synthesis stage f).

16. The process according to claim 14, wherein in said final purification stage e) said purified synthesis gas from stage d) flows through at least one guard bed and/or a catalytic reactor, and said final purification stage e) is performed at an absolute pressure of between 20 and 120 bar.

17. The process according to claim 1, wherein said first synthesis gas constitutes 20 to 80 vol. % of the synthesis gas flow entering said stage a).

18. The process according to claim 1, wherein said first synthesis gas constitutes 40 to 60 vol. % of the synthesis gas flow entering said stage a).

19. The process according to claim 1, wherein stage b1) is carried out at an absolute pressure between 30 and 50 bar, at a gas hourly space velocity between 1500 and 8500 $h^{-1}$, and at a temperature between 250 and 500° C.

20. The process according to claim 1, wherein the gaseous effluent leaving stage b1) is sent directly to acid gases removal stage b2).

21. The process according to claim 1, wherein the synthesis gas flow leaving the COS and HCN catalytic hydrolysis stage c1) is sent directly to acid gases removal stage c2).

22. The process according to claim 1, wherein said second aqueous solution of amines does not contain a secondary amine.

23. The process according to claim 1, wherein said first aqueous solution of amines consists of one or more secondary amines, one or more tertiary amine, and water, and said second aqueous solution of amines consists of one or more tertiary amine and water.

24. A process for purification of synthesis gas, comprising at least the following stages:

a) a stage for dividing the synthesis gas into at least a first synthesis gas flow and a second synthesis gas flow of the same composition, b1) a stage for the steam conversion of carbon monoxide of the first synthesis gas flow leaving stage a), in order to produce a stage b1) gaseous effluent containing at least hydrogen $H_2$ and carbon dioxide $CO_2$ and acid gases including $H_2S$ and $CO_2$, b2) a stage for the removal of acid gases including $H_2S$ and $CO_2$ from the stage b1) gaseous effluent by contacting said stage b1) gaseous effluent with a solvent which is a first aqueous solution of amines comprising at least one secondary amine, said first aqueous solution of amines further comprising at least one tertiary amine or a sterically hindered secondary amine different from the secondary amine and containing at least one quaternary carbon atom in the $\alpha$ or alpha position of the nitrogen atom or two tertiary carbon atoms in the $\alpha$ and $\alpha'$ positions, so as to produce at least one stage b2) gaseous effluent, c1) a stage for catalytic hydrolysis of COS and HCN present in the second synthesis gas flow that has not undergone the conversion reaction of carbon monoxide with steam, in order to produce a stage c1) gaseous effluent containing acid gases COS and HCN, c2) a stage for removal of acid gases including $H_2S$ and $CO_2$ from said stage c1) gaseous effluent by contacting said stage c1) gaseous effluent with a solvent which is a second aqueous solution of amines containing at least one tertiary amine, so as to produce at least one stage c2) gaseous effluent, wherein the second aqueous solution of amines contains between 25 and 50 wt. % of a tertiary amine and contains between 50 and 75 wt. % of water, and d) recombination of at least a part of said stage b2) effluent and at least part of said stage c2) to obtain a purified synthesis gas, wherein said first aqueous solution of amines is sensitive to the presence of CO and said second aqueous solution of amines is insensitive to the presence of CO.

\* \* \* \* \*